Jan. 20, 1970 W. H. HERMAN ET AL 3,490,414
METERING AND DISPENSING DEVICE FOR VISCOUS LIQUIDS
Original Filed March 8, 1966

INVENTORS.
WALTER H. HERMAN
ROBERT C. CROWE
WALTER S. RAY
BY
ATTORNEY.

United States Patent Office 3,490,414
Patented Jan. 20, 1970

3,490,414
METERING AND DISPENSING DEVICE
FOR VISCOUS LIQUIDS
Walter H. Herman, South Hadley, Mass., and Walter S. Ray, Blackwood, and Robert C. Crowe, Cherry Hill, N.J., assignors to Scott Paper Company, Philadelphia, Pa., a corporation of Pennsylvania
Original application Mar. 8, 1966, Ser. No. 532,781. Divided and this application Dec. 31, 1968, Ser. No. 801,899
Int. Cl. B05c 1/12
U.S. Cl. 118—212                                3 Claims

ABSTRACT OF THE DISCLOSURE

Apparatus is disclosed for metering amounts of viscous liquid from a reservoir and for transferring them to a remote point for application to a surface. The apparatus includes a rotatable cylindrical element having one or more surface depressions and being mounted in a reservoir containing a viscous liquid. An elongate portion of the cylindrical element is presented to the exterior through an elongate opening in the reservoir and bounded by two doctor blades which prevent leakage, evaporation and contamination of viscous liquid in the reservoir and regulate the amount of viscous liquid removed from the reservoir in the surface depression upon rotation of the cylindrical element.

---

Figure 2:
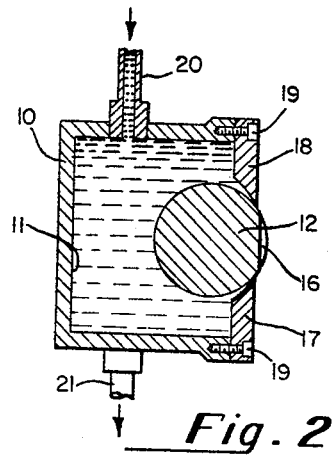

This application is a division of U.S. patent application, Ser. No. 532,781, filed Mar. 8, 1966, entitled "Metering and Dispensing Device for Viscous Liquids."

BACKGROUND OF THE INVENTION

Field of the invention

This invention relates to a liquid metering and dispensing device and, more particularly, to a new and improved device for separating predetermined or metered amounts of relatively viscous liquids from a supply reservoir and for transferring them to a remote point for application to a surface.

Brief description of the prior art

In the past, there has been a problem in many industries of applying measured amounts of relatively viscous liquids to a surface. For example, this function is a critical part of many processes in the fiberboard container making and packaging art, where a liquid such as glue is to be applied to a surface in a measured amount and at a predetermined time and area. It is often desirable to regularly dispense and apply measured amounts of other liquids, such as lubricants or relatively viscous oils, to a surface.

For the purposes of this invention, the term "viscous liquid" has been used to designate and is intended to encompass all highly viscous liquids including glues, cements, binders, adhesives, mixtures of glutinous substances, lubricants, heavy oils, etc.

In other words, as will become evident from the following description, the apparatus of the invention can be employed to dispense predetermined amounts of any relatively viscous liquid and to transfer such amounts to a remote position. The viscosity of the liquids used can vary depending on the speed of operation of the apparatus as employed. They should generally be more viscous than water and should demonstrate some temporary tendency to resist flow or change in shape or arrangement.

Different devices have been conceived which employ a variety of means to separate measured amounts of viscous liquids such as glue from a supply reservoir and apply them to a surface. For example, one method employed has been that separating a measured amount of glue from a supply and impinging it against the surface. One means for doing this operates as a glue gun and involves the application of a blast of compressed air to an amount of glue disposed within a feed-out tube from a glue reservoir.

Although some control can be achieved in this method, it is desired in most cases to more accurately determine the amount of a viscous liquid applied. It is also desired to more accurately control the area of application of the measured amount of viscous liquid. This becomes important and difficult to accomplish with prior art devices, especially where the surface to which the viscous liquid is to be applied is that of a rapidly moving web and where precise timing becomes a significant factor. Operation of prior art devices presents even greater problems as the speed of manufacturing equipment increases and the period of time for measuring amounts of a viscous liquid and transferring them to a surface is decreased.

A particular area in which devices such as the above have been employed and in which the above problems have become important is that of the paper industry with regard to transferring adhesive to a moving paper web coming from a parent roll of paper or from a paper manufacturing machine for the purpose of attaching the tail end of a predetermined length of paper to the roll upon which the predetermined length has been wound, which process is often referred to as tail tying. In this instance, it has been found advantageous to apply adhesive or glue in a continuous or intermittent line transversely across a rapidly moving paper web adjacent to or with reference to the transverse line where the paper web is to be severed. Severance normally occurs upon the completion of winding of one small product roll from a large parent roll and prior to the commencement of the winding of a successive small product roll.

Most winding operations are now performed at a very high rate of speed, that is, where the velocity of the paper web is 1200 feet per minute and higher, and on a so-called continuous basis. Some of the previous methods employed to apply adhesive to the moving web in tail tying processes involved glue guns and moving brushes. These are no longer satisfactory or reliable for high speed winding and new means have become necessary to increase the speed of application and to improve the accuracy of the amount of adhesive applied as well as the area within which it is applied.

If excessive adhesive is applied to a roll for such a purpose, some of it tends to be thrown off the rapidly rotating wound roll due to centrifugal force. In addition, the excessive adhesive tends to permeate several layers of the paper product on the wound roll and creates difficulty to a user in locating a loose end and starting the roll to unwind for use. Similar problems are caused by application of adhesive to overly large areas of the wound roll. If insufficient adhesive is applied, the tail end of the web will be loose or come loose during subsequent packaging and handling, resulting in fouling of the wrapping machinery and an unsightly appearance of the product. Similar problems result from inaccurate placement of the measured amount of adhesive.

In view of the aforementioned difficulties and shortcomings of the prior art viscous liquid metering and dispensing devices, it is a principal objective of the present invention to provide a viscous liquid metering and dispensing device which is capable of accurately separating metered amounts of a viscous liquid from a supply reservoir and transferring these measured amounts to a remote point for application to the surface of an article such as a rapidly moving web.

It is an additional object of the invention to provide a viscous liquid metering and dispensing device adapted to apply the liquid across a relatively wide rapidly moving paper web in a predetermined pattern of continuous or intermittent areas.

SUMMARY OF THE INVENTION

The invention provides a housing having walls defining a chamber for containing a supply of a viscous liquid such as adhesive or glue, which housing has an elongate opening therein. A rotatably mounted metering mandrel having a generally curvilinear metering surface interrupted by at least one surface depression at least at one point on its periphery is disposed relative to the elongate opening so that, during rotation of the mandrel, one elongate portion of said metering surface is continuously presented to the chamber within the housing while another portion of the metering surface is continuously presented exterior of the housing. Two doctor blades bound the elongate opening in the housing and adjoin the curvilinear metering surface of the mandrel. The doctor blades are adapted to sealingly contact the portions of the metering surface exclusive of the surface depression(s) as the mandrel is rotated. In this manner, retention of evenly metered amounts of viscous liquid is effected only within the surface depression(s) when a portion of the curvilinear surface containing at part of the surface depression(s) is presented to the exterior of the housing.

In order to apply the metered amounts of viscous liquid to a surface such as that of a moving web, the entire housing and metering mandrel may be advanced by an actuation means to a position of interference between the surface depression(s) and a moving web at a predetermined time whereupon the web will receive an application of a metered amount of viscous liquid on the desired portions. The preferable manner of transferring the metered amounts of viscous liquid involves the use of an associated transfer means such as a resilient transfer bar which may be conveniently located and carried upon the surface of a rotating cylinder. Once the desired amount of viscous liquid is disposed upon the surface depression(s) on the metering mandrel, separated from the chamber, and presented to the exterior of the housing, the transfer bar is advanced by rotation of its carrying cylinder into interference with the metering surface so as to remove the predetermined metered amount of viscous liquid from the surface depressions of the metering mandrel. Upon further rotation of the carrying cylinder at the desired time, the transfer bar is arranged to contact the surface of a moving web so as to transfer the viscous liquid to the web at the desired point.

Figure 1:
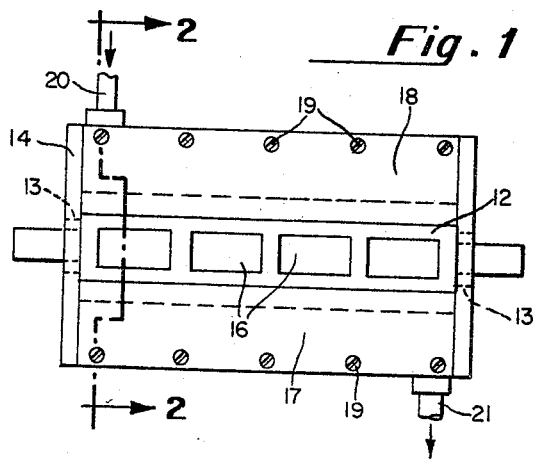
Figure 3:
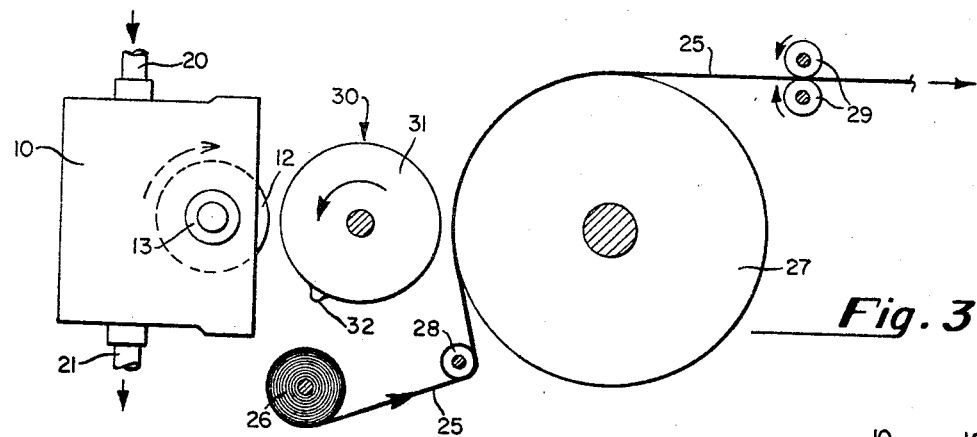
Figure 4:
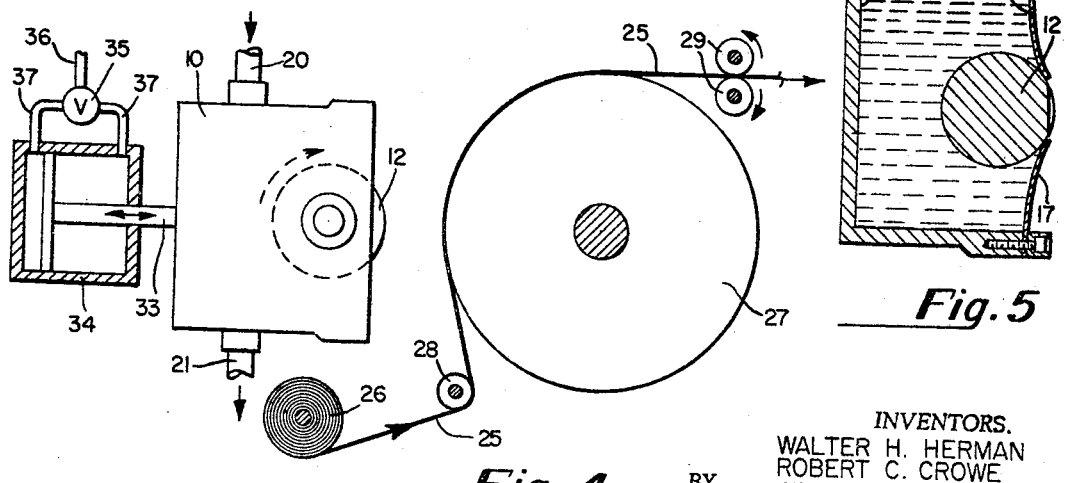
Figure 5:
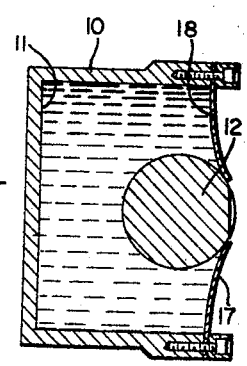

Additional objects and advantages of the invention will be apparent from the following detailed description thereof, when read in conjunction with the accompanying drawings, in which:

FIGURE 1 is an elevation view of a viscous liquid metering and dispensing device of the invention, FIGURE 2 is a sectional view taken along line 2—2 of FIGURE 1, FIGURE 3 is a diagrammatic sectional view of a viscous liquid metering and dispensing device and associated transfer means for transferring a measured amount of viscous liquid to a moving web, FIGURE 4 is a diagrammatic sectional view of a viscous liquid metering and dispensing device movable by an associated actuation means into contact with a moving web, and FIGURE 5 is a sectional view similar to FIGURE 2 illustrating a modified form of doctor blades 17 and 18.

DESCRIPTION OF THE PREFERRED EMBODIMENTS

Referring now to FIGURES 1 and 2 of the drawings, there is shown a housing means 10 having walls which define an elongated channel or chamber 11 and having an elongated opening within which is longitudinally disposed a metering mandrel 12. Metering mandrel 12 is substantially cylindrical in form and is rotatably mounted and carried by bearing means 13 supporting each end and affixed in end walls 14 of housing means 10. The bearing means 13 also are adapted to seal the interior of the chamber 11 from the atmosphere. Metering mandrel 12 has a plurality of surface depressions 16 spaced apart along its length in aligned relationship along one point on its periphery.

The surface depressions shown in FIGURES 1 and 2 are rectangular areas formed by flat planes cut into the metering surface of metering mandrel 12 at spaced intervals and parallel to the axis of mandrel 12. The resulting mandrel 12 is a cylinder having a plurality of geometric segments removed at spaced intervals along its depth. Obviously, a large variety of surface depressions 16 could be formed in metering mandrel 12. Such surface depressions could be of a substantially different shape, size, and nature other than the flats shown. The surface depressions might, in certain instances, be interconnected to form one continuous surface depression along the length of metering mandrel 12 and might be located at one or more angular positions upon the periphery of metering mandrel 12 in order to sequentially transfer viscous liquid to different areas.

Two doctor blades 17 and 18, are longitudinally disposed in spaced apart relation to each other on either side of the elongate opening in housing means 10 and sealingly contact the surface of metering mandrel 12. Doctor blades 17 and 18 may be secured to housing means 10 by a series of bolts 19 thereby forming a tight seal with the walls of housing means 10 flanking the exposed portion of metering mandrel 12. Metering mandrel 12 is positioned within the chamber 11 so that the major portion of it rotates within the interior of the housing means in chamber 11 but a minor elongate portion of its cylindrical metering surface is exposed to the exterior between the free extending and contacting edges of doctor blades 17 and 18 which are spaced apart from each other along either side of the elongate opening to the chamber 11 as described above.

The chamber 11 is filled with a viscous liquid such as glue or adhesive and upon rotation of metering mandrel 12, either by hand or by a suitable mechanical rotational indexing device, the surface depressions 16 in the cylindrical surface of metering mandrel 12 are contacted by the glue or adhesive. During one revolution of mandrel 12, the entire cylindrical surface of metering mandrel 12 is moved past one of doctor blades 17 or 18 to remove substantially all of the viscous liquid from the cylindrical surface of the metering mandrel 12 but leaving a fixed predetermined amount on the surface depressions 16. The opposite doctor blade serves to clean the surface of the metering mandrel prior to its passage into the supply chamber again to prevent contamination of the viscous liquid therein and also serves to provide a moving seal against the metering surface of the rotating mandrel to prevent leakage of the viscous liquid from housing means 10. In accordance with the invention, the fixed amount of viscous liquid may be removed from surface depressions 16 by application directly to a surface or it may be transferred to the surface of a work piece or sheet by an associated transfer means to be subsequently described.

The doctor blades 17 and 18 shown in FIGURE 2 are of a fixed shape and constructed in a stiff manner so as to ride in sealing contact upon that portion of the metering surface of the metering mandrel 12 which has a curvilinear configuration which, in some instances, as in the embodiment shown, is cylindrical. The mandrel-contacting edges of the doctor blades of this type do not necessarily exert a great amount of pressure against the mandrel to form a seal and therefore have little tendency or ability to move inwardly against the bottom of the surface depressions during rotation if curvilinear supporting areas are not left between surface depressions, as where the mandrel 12 has one continuous surface depression along its length.

FIGURE 5 illustrates a modified form of doctor blades 17 and 18 which may be advantageously employed in the viscous liquid metering and dispensing device of the invention. As shown in FIGURE 5, doctoring blades 17 and 18, which are preferably made of a plastic or a resilient metal such as spring steel, are bolted to the front of the housing means 10 in the manner similar to that described in FIGURE 2. Their elongate edges, which extend inwardly of the elongate opening in the housing 12, bear against the metering surface of the mandrel 12 in a somewhat tangential manner. Thus, the edges continuously ride in sealing contact with the curvilinear or cylindrical portion of the metering surface of the mandrel 12 and leave a precise predetermined amount of viscous liquid upon the metering surface of the mandrel within its surface depressions when they are exposed to the exterior during rotation thereof. With this latter flexible, resilient type of doctor blade, it is desirable to have a plurality of surface depressions spaced along the length of the mandrel so as to be separated by a plurality of interspersed curvilinear or cylindrical blade supporting portion of the metering surface. This provides a plurality of bearing surfaces which serve to support the doctor blades and prevent undue bending of the blades and contact of the blades with the bottom of the surface depressions.

In some instances, it is desirable to dispense, with a device of this type, a viscous liquid such as glue which is relatively fast drying or which contains volatile ingredients and is susceptible to damage upon prolonged exposure to air. It is also desirable in some instances to continuously circulate viscous liquid through a heating means in order to maintain it at the desired viscosity for metered use. As shown in FIGURES 1 and 2, viscous liquid may be circulated through the chamber 11 within housing means 10 by feeding it into chamber 11 through one or more inlets 20 on housing means 10 and withdrawing it from chamber 11 through one or more outlets 21 on housing means 10. In this manner, a heater (not shown) and/or a pump (not shown) may precede inlet 20 and be arranged to circulate viscous liquid from a remote supply reservoir (not shown) through the housing means 10 in a continuous manner thereby insuring at all times a fresh supply of such liquid having the desired properties.

FIGURE 3 illustrates in schematic form a metering and dispensing device constructed according to that shown in FIGURES 1 and 2 and arranged in combination with a transfer means, indicated generally by reference numeral 30, for transferring viscous liquid from the exposed elongate portion of the metering surface of metering mandrel 12 to a moving flexible web. The transfer means 30 comprises a cylinder 31 rotatably mounted on an axis parallel to the longitudinal axis of metering mandrel 12. Cylinder 31 has a raised land portion comprising an elongate strip-like protuberance 32 located upon its surface and extending longitudinally across the surface of cylinder 31 from one end to the other. As shown in FIGURE 3, protuberance 32 is broader at its base adjacent the surface of cylinder 31 and is rounded off at its outermost extremities which are the portions contacting the metering mandrel 12 and carrying the metered amount of viscous liquid to be transferred. Protuberance 32 is preferably formed of a flexible, resilient material such as rubber to allow it to readily conform to the shape of the surface with which it comes in contact.

In one typical embodiment wherein the above-described apparatus is employed, a web 25, which may comprise any flexible sheet material such as paper or cloth, is drawn from a parent roll 26 and fed into contact with a support roll 27 by means of a guide roll 28 and subsequently withdrawn from the support roll 27 through a pair of spaced tension rolls 29 to a remote point. Transfer roll 30 is disposed between the portion of the web 25 resting on the surface of support roll 27 and the exposed elongate portion of the metering surface of metering mandrel 12. Transfer roll 30 may be actuated continually or intermittently thereby causing protuberance 32 to sweep past the exposed elongate portion and come in contact therewith at a time when the surface depressions 16 are exposed so as to remove viscous liquid from within the surface depressions. Upon further rotation of cylinder 31, protuberance 32 is swept past the web 25 in contact with the desired area thereof to transfer the metered amount of viscous liquid to the surface of the moving web 25. In this regard, the transfer roll 30 is positioned so that the protuberance contacts the metering mandrel 12 with sufficient force to depress the rubber protuberance into the surface depressions in order to directly remove the measured amounts of viscous liquid. The surface speed of cylinder 30 is preferably coordinated with the speed of the moving web 25 so that when the protuberance 32 contacts the web, the resulting frictional force due to velocity differential between the protuberance 32 and the web is not sufficient to tear the web where this is undesired.

It will be obvious from the above that the protuberance 32 could be continuous and be disposed along the surface of transfer roll 30 in alignment with the axis thereof. However, it might also be intermittent and it might be positioned askew of the axis of roll 30 so as to successively transfer viscous liquid from the metering mandrel 12 to succesive areas along the length of the web 25. In addition, a plurality of protuberances could be spaced apart on the surface of cylinder 30 at different points on its periphery so as to contact the web at different times and at areas spaced from one another. A variety of patterns might be created in this manner.

Referring to FIGURE 4, there is shown an alternative embodiment of the metering and dispensing device of the invention which involves the use of an actuation means operatively attached to housing means 10 and adapted to reciprocably advance and withdraw housing means 10, and correspondingly, the metering surface of metering mandrel 12 toward and away from contact with a moving paper web 25. As in the embodiment shown in FIGURE 3, a web 25, which may comprise any flexible sheet material such as paper or cloth, is drawn from a parent roll 26 and fed into contact with a support roll 27 by means of a guide roll 28 and subsequently withdrawn from the support roll 27 through a pair of spaced tension rolls 29 to a remote point. A metering and dispensing device constructed according to FIGURES 1 and 2 is disposed in spaced apart relationship to the web 25 where it contacts support roll 27. Housing means 10 is fixedly secured to one end of a piston 33, the opposite end of which extends into a double action air cylinder 34. Double action air cylinder 34 is operated by means of high pressure air passing into a valve 35 through a feed line 36. By operation of valve 35, the high pressure air may be directed through one or the other of feed lines 37 into a respective end of double action air cylinder 34.

Upon a predetermined area of the web 25 moving into contact with the surface of support roll 27, the double action air cylinder 34 may be actuated to cause it to advance housing means 10 and metering mandrel 12 toward web 25 and support roll 27 to a point where the exposed elongate portion of the metering surface of metering mandrel 12 contacts web 25. The flexible nature of web 25 allows it to conform to the metering surface of metering mandrel 12 and to wipe off or remove the metered amount of viscous liquid contained within the surface depressions upon metering mandrel 12.

Where the flexibility of the web is insufficient to allow it to conform to the surface of metering mandrel 12, a flexible support roll 27 may be used, such as a rubber roll, which will allow substantially complete removal of the measured amounts of viscous liquid by the predetermined areas of the web 25 when employed in the embodiment described above. Other actuation means such as hydraulic cylinders or cams could be employed with equal success for moving the metering and dispensing device.

From the above, it is apparent that the invention provides a new and improved device for separating and dispensing predetermined amounts of viscous liquid from a supply reservoir and for transferring them to a remote point. Furthermore, it is obvious that many alterations in the specific form of the invention described above may be made without departing from the spirit and scope of the invention.

What we claim is:

1. A liquid metering and dispensing device comprising:
an elongated reservoir having a body of viscous coating material therein;
a wall of said reservoir defining a slot opening extending along the longitudinal extent thereof;
an applicator roll rotatably mounted on and substantially within said housing so as to be immersed in said viscous material and disposed parallel to and extending through said slot opening;
said slot being defined by a pair of opposed, straight edged doctor blades which opeartively seal said reservoir and meter said applicator roll;
said applicator roll comprising at least one planar, applying portion disposed along the axial extent thereof and including a chordal portion of said roll;
means supporting a continuously moving substrate in operative association with said applicator roll; and
means to reciprocate said reservoir and applicator roll to and from said substrate.

2. The apparatus of claim 1 wherein the applicator roll includes an aligned plurality of said planar applying portion.

3. The apparatus of claim 2 wherein said means to reciprocate comprises a double acting air cylinder.

References Cited

UNITED STATES PATENTS

| | | | |
|---|---|---|---|
| 561,180 | 6/1896 | Sargent | 29—121 |
| 835,084 | 11/1906 | Tuggle | 222—368 X |
| 2,269,150 | 1/1942 | Flynn | 118—324 X |
| 2,589,966 | 3/1952 | Rullo. | |
| 2,606,520 | 8/1952 | Hoel | 101—351 X |
| 3,048,145 | 8/1962 | Stover | 118—241 X |
| 3,052,210 | 9/1962 | Hughes | 118—241 X |
| 3,008,407 | 11/1961 | Roberts et al. | 118—259 X |
| 3,116,166 | 12/1963 | Halley | 118—241 X |

FOREIGN PATENTS

| | | |
|---|---|---|
| 1,052,297 | 9/1953 | France. |
| 835,855 | 5/1960 | Great Britain. |

MORRIS KAPLAN, Primary Examiner

U.S. Cl. X.R.

118—221